No. 12,674. REISSUED JULY 23, 1907.
A. S. MARTEN.
SUPPORT FOR AMPLIFYING HORNS.
APPLICATION FILED JAN. 4, 1905.
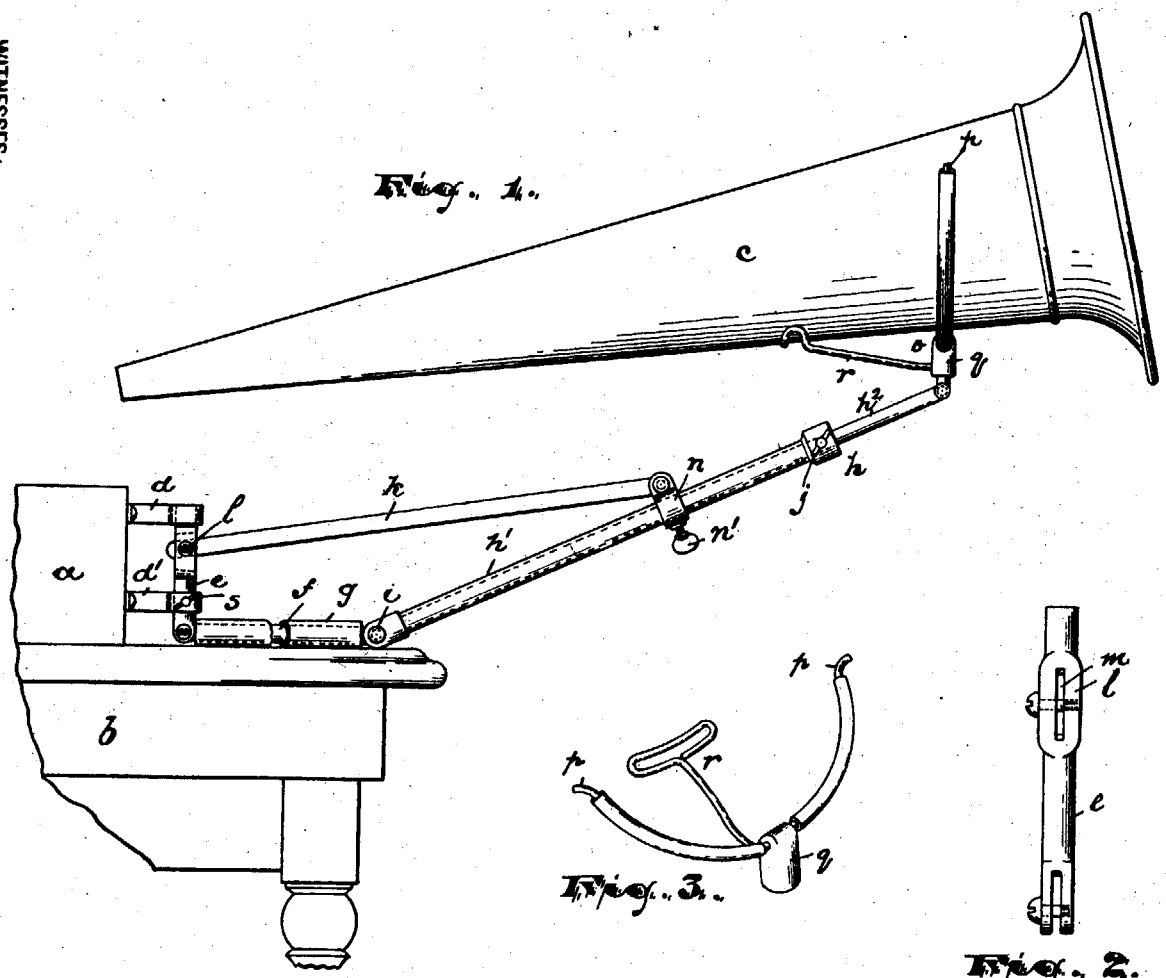
WITNESSES:
Ralph Lancaster
Russell M. Everett.
INVENTOR:
Albert S. Marten,
BY
Charles H. Bell
ATTORNEY.
THE NORRIS PETERS CO., WASHINGTON, D. C.

UNITED STATES PATENT OFFICE.

ALBERT S. MARTEN, OF EAST ORANGE, NEW JERSEY, ASSIGNOR TO THE TEA TRAY COMPANY OF NEWARK, N. J.

SUPPORT FOR AMPLIFYING-HORNS.

No. 12,674. Specification of Reissued Letters Patent. Reissued July 23, 1907.

Original No. 726,320, dated April 28, 1903, Serial No. 92,189. Application for reissue filed January 4, 1905. Serial No. 239,690.

*To all whom it may concern:*

Be it known that I, ALBERT S. MARTEN, a citizen of the United States, residing at East Orange, in the county of Essex and State of New Jersey, have invented certain new and useful Improvements in Supports for Amplifying-Horns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a more convenient, simple and firm support for an amplifying horn projecting horizontally, or approximately so, from a sound reproducing machine and to secure other advantages and results, some of which may be referred to hereinafter in connection with the description of the working parts.

The invention consists in the improved horn support and in the arrangements and combinations of parts, all substantially as will be hereinafter set forth and finally embraced in the clauses of the claim.

Referring to the accompanying drawings, in which like letters of reference indicate corresponding parts in each of the several figures, Figure 1 is a side elevation of the support in connection with the box or case of a sound reproducing machine and the amplifying horn; Fig. 2 is a detail elevation of a certain pivotal shaft, and Fig. 3 is a detail perspective view of a horn rest or holder adapted to be seated at the outer end of the support.

In said drawings, *a* indicates the box or case to which the support is preferably attached. *b* represents the table on which said box or case may be seated, and *c* the horn arranged upon the support in approximately the position preferred for service. Upon said box *a*, are brackets *d*, *d'*, providing at their projecting ends bearings for a pivotal rod or bar *e*. At the lower end of said rod or bar *e*, is pivoted or connected a horizontal rod *f*, which is preferably provided with a rubber or other cushion-like sleeve *g*, by which the table *b*, on which said horizontal rod preferably rests, is protected from injury. To the outer end of said horizontal rod *f*, an inclined rod *h*, is pivoted, as at *i*, the said rod *h*, being preferably in sections *h'*, $h^2$, having a sliding relation and preferably a telescopic relation one to the other, the said sections *h'*, $h^2$, being adjustable one to the other and being set at any desired adjustment by a set screw *j*, or other proper means. The inclined sectional rod is held in an inclined position by a brace or stay *k*, which is pivoted, as at *l*, upon the rod or bar *e*, preferably in a longitudinal slot *m*, therein, Fig. 2, and at its outer end is pivoted upon a sliding collar *n*, arranged on the outer end of the tubular section *h*, of the inclined rod. Said sliding collar *n*, is furnished with a set screw *n'*, or setting means, by which it is fastened at any proper adjustment upon said inclined rod.

At the outer end of the inclined rod is pivoted or otherwise seated a horn holder *o*, which preferably comprises a semi-circular or forked piece *p*, having a shank *q*, between the prongs of the fork and a rearward arm *r*, also adapted to engage the underside of the horn. The arm and prongs which are preferably of metal, are preferably covered with rubber tubing or other soft cushion-like material to prevent injury to the horn. The pivotal connection of the holder *o*, is preferably free, so as to permit the holder to automatically adjust itself to the horn as the inclined arm is raised or lowered.

The pivot *e*, is vertically adjustable in its bearings and may be fixed at the desired adjustment by a set screw *s*.

I am aware that modifications of the construction may be made from that above described in positive terms without departing from the spirit or scope of the invention.

In operating the device, the parts being in the relation shown, by simply releasing the set screw *n'*, the inclined arm and the horn supported thereby may be raised or lowered to give the horn any desired direction in a given vertical plane. By releasing the set-screw *s*, of the pivotal rod or bar *e*, the latter, together with the inclined arm and horn may be turned laterally to the desired direction, and when so released, the pivotal bar may be lowered to enable the horizontal bar or rod *f*, to be seated on the table, so that the said table takes the weight of the horn and reduces the tendency of the box or case *a*, to tilt when subjected to the weight of said horn.

Having thus described the invention, what I claim as new is:—

1. The combination with the box or case of a sound reproducing machine, of a sectional horn support attached at its lower end to the said box or case and movable with said box or case without changing the relation existing between said support and said box or case, the section of said support distant from said box or case having a slidable relation to the section attached to said box or case and having a fork between the prongs of which the amplifying horn may rest and said amplifying horn seated near its larger end between the prongs of said fork, substantially as set forth.

2. The combination with the box or case of a sound reproducing machine, of an amplifying horn, and an extensible horn support connected at one end to said box and at its opposite end furnishing a holder for the large end of the horn, said large end being separably arranged upon said holder, and said support being in adjustable sections, permitting the holder to be raised and lowered and moved lengthwise of the horn, and moved horizontally and laterally with respect to the longitudinal axis of the horn, substantially as set forth.

3. The combination with the box or case of a sound reproducing machine, and a horn extending away therefrom, of a vertical pivotal rod attached to said box, a horizontal rod connected to the lower end of said pivotal rod and lying flush with the bottom of said box and an inclined rod extending upward toward the large end of the horn, a brace connecting an upper part of said pivotal rod with the upper part of said inclined rod, and a fork attached to the upper end of said inclined rod and engaging the horn near the large extremity thereof, substantially as set forth.

4. The improved horn support, comprising a vertical rod adapted to be movably attached to the box or case, a horizontal rod attached to the lower end of said vertical rod and adapted to oscillate therewith, an inclined rod pivotally connected to the outer extremity of the horizontal rod and extending therefrom upward and away from said vertical rod, the inclined rod being in extensible telescopic sections, a brace extending from the upper part of the vertical rod to the inclined rod and away from its connection with the horizontal rod, and a fork pivotally arranged at the upper and outer extremity of the inclined rod, substantially as set forth.

5. The improved horn support, comprising a pivotal rod adapted to be attached to the side of a box or case and oscillate thereon, a horizontal rod pivoted to the lower end of said pivotal rod, an inclined rod connected to the outer end of said horizontal rod and adapted to be raised or lowered at its outer free end, a brace pivotally attached to the pivotal rod at one end and at the opposite end to a sliding collar arranged on said inclined rod, said collar having means for setting said collar in its relation to the inclined rod, and a horn supporting fork adapted to receive the large end of the horn, substantially as set forth.

6. The combination with the pivotal rod of a horn support, of an inclined extensible rod connected to the pivotal rod, a brace pivotally connected with said extensible rod and pivotal rod and a horn fork pivoted on the free end of said inclined extensible rod and adapted to engage the large end of the horn, said fork having an arm extending back from said fork to engage the horn nearer the small end thereof, substantially as set forth.

7. The combination with an inclined sectional rod adapted to be connected to a box or case, of a fork attached to said rod and having prongs between which an amplifying horn may enter and be supported and a third arm attached to said fork and extending backward therefrom, away from the extremity of said sectional rod, to engage the horn at a distance from the large end of the said horn back from where it is engaged by said prongs, substantially as set forth.

8. The combination with a box *a*, and horn projecting laterally away therefrom, of the bearings attached to said box, a vertical rod pivotally arranged in said bearings, a rod extending horizontally at the plane of the bottom of said box, an inclined rod extending from the outer end of the said horizontal rod, a brace extending from the vertical rod to the inclined rod and adapted to hold the latter in inclined position and a horn holder attached to the outer end of the inclined rod and engaging the large end of the horn, substantially as set forth.

9. The combination with the box *a*, and horn, of the vertical rod pivotally connected with the side of said box, an inclined, telescopically extensible rod connected to the lower end of said vertical rod, a brace connecting the upper part of the vertical rod with said inclined rod, and a fork pivoted at the outer end of said inclined rod, between the prongs of which the large end of the horn is seated, substantially as set forth.

10. The improved horn support, comprising means of attachment to the case of a sound reproducing machine, a pivotal rod in connection with said means of attachment, means in connection with said means of attachment to engage the table and prevent the case thereon from tilting, a horn supporting arm in extensible sections, and a horn holder at the projecting end of said supporting arm.

11. The improved horn support, comprising means for attachment to the case of a sound reproducing machine, a vertical rod in connection with said means for attachment, means adapted to extend away from the machine and engage the top of the table to prevent tilting of the case on said table, and horn holding means adapted to support the large end of the horn, substantially as set forth.

12. The combination with the box or case and a horn having its large end projecting away therefrom, of a horn support attached to said case and having means at the bottom of the case to engage the top of the table and prevent said case from tilting under the weight of said large end, said horn support being extensible and movable both horizontally and vertically, substantially as set forth.

13. The combination with the box and horn of a talking machine, of a vertical rod pivotally connected with the side of the box, an inclined telescopically extensible rod connected to said vertical rod and movable therewith horizontally, a brace connecting the vertical and inclined rods and permitting a change of inclination of said inclined rod, means for fixing the inclined rod at the desired inclination or adjustment relative to the box, and a holder for the large part of the horn at the end of the inclined rod.

14. The improved horn support for talking machines, comprising a vertical rod, means for the attachment of said rod to a talking machine box, said means providing pivotal bearings for said vertical rod, a telescopically sectional rod pivotally connected with said vertical rod and projecting laterally away from the said vertical rod, a brace and means for fixing the relation of said brace to said sectional rod, and horn holding means attached to the projecting end of the telescopic rod.

15. The improved horn support for talking machines, comprising a pivotal rod, means for attaching said rod to a talking machine box, said means providing bearings for said pivotal rod, means for setting said pivotal rod in its relation to said attaching means, a sectional rod inclining upward from said pivotal rod and at its upper end having a horn holder, means for fixing the sections of the said sectional rod in their relation to one another, a brace connecting the said sectional rod with the pivotal rod, said brace having a pivotal relation to the pivotal and sectional rods, and setting means for fixing the brace in its relations to said rods, substantially as set forth.

In testimony that I claim the foregoing, I have hereunto set my hand this 22d day of November, 1904, at Newark, New Jersey.

ALBERT S. MARTEN.

Witnesses:
CHARLES H. PELL,
RALPH LANCASTER.